United States Patent [19]

Harmer

[11] Patent Number: 4,477,724
[45] Date of Patent: Oct. 16, 1984

[54] PHOTOELECTRIC CONTROL DEVICE

[75] Inventor: Alan L. Harmer, Plan les Ouates, Switzerland

[73] Assignee: Battelle Memorial Institute, Carouge, Switzerland

[21] Appl. No.: 394,109

[22] Filed: Jul. 1, 1982

[30] Foreign Application Priority Data

Jul. 6, 1981 [EP] European Pat. Off. ........ 81810273.3

[51] Int. Cl.³ .............................................. G02B 5/14
[52] U.S. Cl. .................................... 250/227; 250/229
[58] Field of Search .............................. 250/227, 229; 350/96.15, 96.20; 340/365 P

[56] References Cited

U.S. PATENT DOCUMENTS

| 4,071,753 | 1/1978 | Fulenwider et al. | 250/227 |
| 4,204,742 | 5/1980 | Johnsen et al. | 350/96.20 |
| 4,315,147 | 2/1982 | Harmer | 250/227 |
| 4,384,203 | 5/1983 | Wells | 250/227 |

FOREIGN PATENT DOCUMENTS 0033128 3/1980 Japan ................................ 350/96.20

OTHER PUBLICATIONS

Article in Applied Optics, vol. 19, No. 1, Jan. 1980 by W. B. Spillman Jr. et al., entitled "Frustrated-total-internal-reflection/multimode fiber-optic hydrophone.
Brady et al., "Solid-State Optical Switch", vol. 20, No. 11A, IBM Technical Disclosure Bulletin, Apr. 1978; p. 4652.

Primary Examiner—David C. Nelms
Assistant Examiner—Edward P. Westin
Attorney, Agent, or Firm—Karl F. Ross; Herbert Dubno

[57] ABSTRACT

A switching device comprises two optical fibres disposed in two respective supports located one in line with the other. One of these supports is articulated about a transverse axis and loaded by a leaf spring which tends to space its free end from the adjacent end of the other support. The adjacent ends of these supports have oblique faces whose angles are supplementary and the movable support has a window exposing a portion of the fibre adjacent to its bevelled end. This fibre is associated with a light-emitting diode and the other fibre with a photodetector. When the adjacent ends of the fibres are spaced apart the light is reflected through the window, and when they are in optical contact the light is transmitted to the photodetector.

4 Claims, 3 Drawing Figures

PHOTOELECTRIC CONTROL DEVICE

The present invention relates to a photoelectric control device comprising a light source, a photodetector, a switch actuated by the photodetector, the on/off condition of this switch being dependent on a light threshold detected by the photodetector, and a drive element rigid with a light reflecting surface which may be displaced between two limit positions, the light being directed towards the photodetector in one of these positions and towards a display element in the other position.

A device of this type has already been proposed in U.S. Pat. No. 4,315,147, this device comprising a push button whose end supports the light reflecting surface, disposed at 45° with respect to the longitudinal axis of the push button which is made of a transparent material. This push button is arranged so as to bring the reflecting surface opposite one end of an optical fibre whose other end is associated with the light source. In this position the reflecting surface directs the light axially through the push button up to its end face at which point it is visible, this face constituting the display element.

The loss of light intensity of a device of this type is comparatively high in particular as a result of the distance between the reflecting surface and the end of the optical fibre towards which the light is directed. The displacement of the control member must have a sufficient amplitude to displace the reflecting surface from the position in which it intercepts the light rays to a position in which it is moved away from their path. A device of this type necessarily comprises a certain number of elements, and the greater the number of elements the longer the assembly operations involved. It may also be seen that as a result of its design this device is not suitable for extra-flat construction which may be a drawback in certain applications.

It has already been proposed in "Applied Optics", Vol. 19, No. 1 of Jan. 1st 1980, pages 113-117, to provide a device for converting an acoustic pressure into an analog optical signal based on the principle of the attenuation of the total internal reflection. For this purpose, use is made of two optical fibres whose ends are cut into two bevels forming supplementary angles and subjected to pressure waves which may vary the spacing between these bevels and which may react at minimum pressures of 62 dB with respect to 1 $\mu$Pa at 500 Hz. A device of this type has also enabled the detection of static displacements which are as small as $4.8 \times 10^{-3}$ Å.

The object of the invention is to adapt this principle to a photoelectric control device having a display of the abovementioned type in order to enable the intrinsic drawbacks of control devices of this type to be remedied to a large extent.

For this purpose, the present invention relates to a photoelectric control device comprising a light source, a photodetector a switch actuated by the photodetector, the on/off condition of this switch being dependent on a light intensity threshold detected by the photodetector, and a drive element rigid with a light reflecting surface which may be displaced between two limit positions, the light being deflected towards the photodetector in one of these positions and towards a display element in the other of these positions. This control device is characterised in that the said reflecting surface is formed by a bevel provided at the end of an optical fibre rigid with the said drive element and having a window for receiving the light from the said reflecting surface when it is in the second of the said limit positions and as a result of the fact that the photodetector is associated with one end of a second optical fibre whose other end is bevelled and forms an angle with the axis of the optical fibre which is the supplement of the corresponding angle of the bevel provided on the other optical fibre, these two optical fibres being coaxial to one another in the first of the said limit positions, the two bevels then being parallel and in mutual optical contact.

One of the advantages of this device is the integration of the reflecting surface and the display window with the optical fibre and its drive element. This leads to a reduction in the number of components and the possibility of construction of a device which is very flat as the optical fibres are parallel to the display and control surface. Bearing in mind the sensitivity of the optical transmission at the interface of the bevelled fibres, the displacement, required for differentiating the two conditions defined by a light transmission threshold between the optical fibres on one hand and a light intensity reflected through the display window sufficient to provide the display on the other hand, is extremely low.

The attached drawing shows in diagram form and by way of example, an embodiment of the photoelectric control device of the invention.

Figure 1:
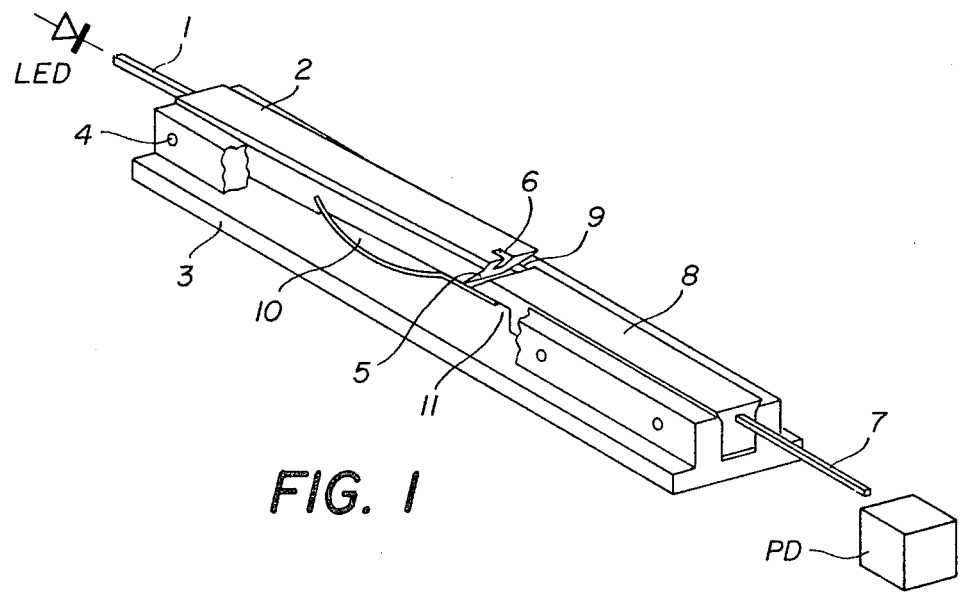
FIG. 1 is a perspective view of this device.

The device shown comprises a first optical fibre 1 embedded in a support 2 connected to a frame 3 by a hinge pin 4 disposed at one end of this support 2. The other end of this support has a bevelled face 5 coplanar with the end of the optical fibre 1. The entire support, with the exception of the bevelled face 5 is covered with a black coating for protecting the optical fibre from ambient light. An open portion 6 is provided in the external face of the support 2 up to the level of the optical fibre 1 and acts as a window enabling external observation of the light rays which are reflected through the surface of the optical fibre 1 by its bevelled end which acts as a prism. The other end of this optical fibre 1 is connected to an electroluminescent diode LED acting as a light source.

A second optical fibre 7 is embedded in a black nylon support 8 fixed to the frame 3 in line with the support 2. The end of this support 8 adjacent to the support 2 has a bevelled face 9 coplanar with the end of the optical fibre 7 and forming with the axis of the fibre a supplementary angle to that which the bevelled face 5 forms with the optical fibre 1 when these fibres are coaxial.

In fact, in the rest position, these fibres are not coaxial and the bevelled faces 5 and 9 are separated from one another. A leaf spring 10 which is fixed to the support 2 has an arcuate portion which is supported on the frame 3 and is terminated by a plane portion which is supported on the lower face of the support 2 and projects beyond the end of this support in order to abut, in the rest position, against a notch 11 provided at the end of the fixed support 8. The other end of the optical fibre 7 abuts on a photodetector PD.

The electroluminescent diode LED transmits light through the optical fibre 1. When the latter is in the position shown, its bevelled end face acting as a prism, reflects the light which emerges through the window formed by the open portion 6 of the support 2.

When a pressure is exerted on the support 2, the latter rocks about its hinge pin 4 until its bevelled face 5 meets the bevelled face 9 of the fixed supported 8. As the ends of the optical fibres adjacent to these bevelled faces are coplanar with these respective faces 5 and 9, they come into contact such that the majority of the light transmitted by the electroluminescent diode LED through the optical fibre 1 is transmitted in the optical fibre 7 and is received by the photodetector PD which is designed to activate a switch (not shown). When the pressure being exerted on the support 2 has ceased, the leaf spring 10 rocks it into the position shown and the bevelled face located at the end of the optical fibre 1 reflects the light rays through the window 6.

Figure 2:
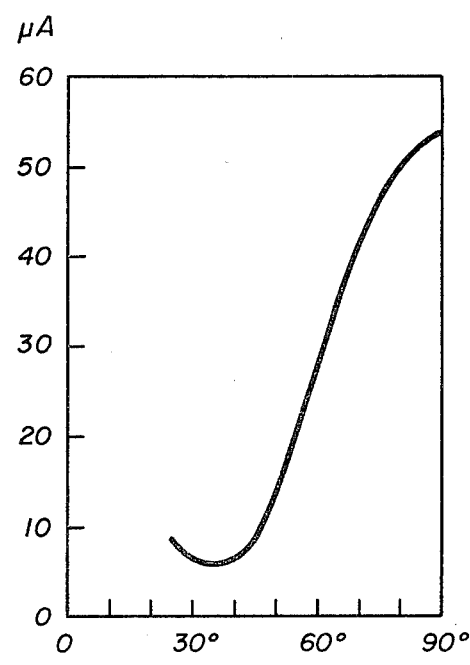
FIGS. 2 and 3 are explanatory diagrams.

The diagram of FIG. 2 shows the light intensity transmitted from one fibre to the other when they are adjacent as a function of the angle of their bevelled faces. It should be noted that the transmission is weakest with an angle of 35°. In the case of a photoelectric control device with display it is scarcely possible to select an angle different from 45° but it will be seen that, even if this angle is close to the minimum transfer conditions, the signal level obtained is substantially higher than in the case of the devices of the independent prism type.

Tests were carried out using the device described and using for the optical fibre 1 associated with the electroluminescent diode LED a fibre of square section of 1 mm on the side and for the optical fibre associated with the photodetector a fibre of square section of 0.7 mm on the side. The adjacent ends of these two optical fibres each have a face bevelled at 45°. The electroluminescent diode used is of the ESBR 5501 type made by the firm Stanley (Japan) and supplied with a current of 20 mA. The photodiode used is of the BPW20 type. When the bevelled faces of the optical fibres are pressed against one another with a force lower than 300 gms the level of the signal sensed by the photodiode PD is 3.0 $\mu$A. The signal level is comparatively 0.28 $\mu$A with a device having an independent prism for the fibres. The loss due to the coupling given in dB = 10 log ($I_o/I$) is 2.4 in the case of the device described whereas it reaches 6.7 with the independent prism. The sensitivity to ambient light with respect to the signal transmitted to the photodiode when the bevelled faces are adjacent is −36 dB in the case of the device of the invention and −31 dB with the independent prism. Finally the amplitude of the displacement of the control member is 0.08 mm in the case of the integrated prism fibre and 0.6 mm in the other case.

It can be seen from these comparative tests that a substantial improvement in performance is obtained by means of the device in which the prism is integrated with the fibre and with a very considerably reduced displacement of the actuation element.

In order to improve the light transmission between the optical fibres a layer of silicon-based plastics material, Silgard 182, having a thickness of 20 $\mu$m was used to coat the bevelled face of the optical fibre 7. This relatively soft layer serves to absorb the microscopic irregularities resulting from the surface condition of the bevelled faces of these fibres. This measurement enables good optical transmission to be obtained with a force of 100 gms, the maximum transmission being obtained at forces in the range of 300 gms with an optical loss of 1.3 dB.

Wear tests were carried out after 1.3 million cycles of actuation of the device. These tests did not reveal any deterioration but, in contrast, showed a slight transmission increase resulting from the wear of the Silgard layer.

The light transmitted when the bevelled faces of the fibres are separated is of the same order of magnitude as the dark current of the photodetector which proves that the device has a high ratio between the on and off conditions.

The sensitivity to ambient light was measured with a tungsten bulb of 100 W at a distance of 1 meter. It was observed that the ambient light only represented at most 30% of the dark current of the photodetector PD and was a factor 2500 times lower than the signal transmitted when the bevelled faces of the fibres were pressed against one another. No variation in sensitivity to ambient light was observed after the wear test.

Figure 3:
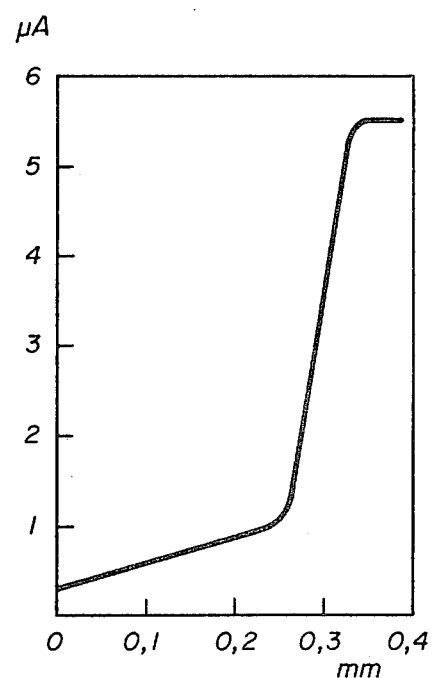

The diagram of FIG. 3 shows the variation of the signal as a function of the displacement of the end of the movable optical fibre 1. It can be seen that the displacement corresponding to the 0.5 mm preceding the contact of the two oblique faces only causes an increase of approximately 20% of the light signal transmitted. The signal then increases rapidly to 100% for 0.8 mm of displacement. No hysteresis was detected, i.e. no difference in the signal level between the displacement of the fibre 1 following a pressure exerted on the support 2 and a displacement following the relaxation of this pressure.

The tests carried out between +60° C. and −25° C. showed a loss of 20% in the signal transmitted at −25° C. which is probably due to a hardening of the Silgard layer. The effects of the actuation speed demonstrate that above 2.5 Hz the signal transmitted begins to decrease and reaches half its value at 10 Hz.

I claim:

1. A photoelectric control device comprising a light source, a photodetector, a switch actuated by the photodetector, the on/off condition of this switch being dependent on a light intensity threshold detected by the photodetector, an actuating element adapted to be displaced between two limit positions, a first optical fibre rigid with the actuating element, having first and second ends of which the first end is displaceable laterally by the said displacement of the actuating element and is bevelled obliquely to the direction of the displacement, a second optical fibre having first and second ends of which the first end is adjacent to the first end of the first optical fibre and is bevelled at an angle supplementary to the angle at which the first optical fibre is bevelled, said second ends being disposed to receive light from the light source and to transmit light to the photodetector, respectively, said optical fibres and actuating element being so disposed that in a first limit position of the actuating element the first ends of the fibres are parallel and in optical contact and the adjoining end regions of the fibres are coaxial whereby a light transmission path is established from the light source through the fibres to the photodetector, and in the other limit position the said first ends are separated whereby the light path is broken and light from the source is reflected laterally at the first end of the optical fibre associated therewith, a window being provided for observation of such laterally reflected light.

2. A device as claimed in claim 1 in which the first optical fibre has its second end arranged to receive light from the source and the second optical fibre has its second end arranged to transmit light to the photodetector.

3. A device as claimed in claim 1, characterised in that at least one of said bevelled ends is covered with a coating of a transparent material which is softer than the material of the fibres.

4. A device as claimed in claim 1, 2 or 3, characterised in that a respective elongate support is provided for that portion of each optical fibre adjacent to the bevelled end thereof, and positioning means are provided for positioning said supports in alignment with each other in the said first limit position, one said support being pivotable about a transverse axis spaced along said support from the bevelled end of the associated optical fibre, and resilient means being provided for urging said one support to a predetermined one of said limit positions.

* * * * *